United States Patent [19]

Dany et al.

[11] 3,943,194

[45] Mar. 9, 1976

[54] FLAMEPROOF MOULDING COMPOSITIONS BASED ON POLYOLEFINS

[75] Inventors: Franz-Josef Dany, Erftstadt Lechenich; Joachim Wortmann, Hurth; Peter Münch, Hurth-Burbach; Günther Braun, Oberhausen, all of Germany

[73] Assignees: Hoechst Aktiengesellschaft; Ruhrchemie Aktiengesellschaft, both of Germany

[22] Filed: Oct. 1, 1974

[21] Appl. No.: 511,015

Related U.S. Application Data

[62] Division of Ser. No. 362,517, May 21, 1973.

[30] Foreign Application Priority Data

May 25, 1972 Germany............................ 2225323

[52] U.S. Cl..... 260/897 B; 260/45.7 P; 260/45.9 R; 260/DIG. 24
[51] Int. Cl.²................... C08L 23/06; C08L 23/12
[58] Field of Search...... 260/DIG. 24, 897 B, 45.7 P

[56] References Cited

UNITED STATES PATENTS

| | | | |
|---|---|---|---|
| 3,395,970 | 8/1968 | Machell | 8/120 X |
| 3,546,160 | 12/1970 | Dany et al. | 260/45.7 |
| 3,663,654 | 5/1972 | Haaf | 260/874 |
| 3,808,127 | 4/1974 | Sander et al. | 260/45.7 P X |

*Primary Examiner*—Carman J. Seccuro
*Attorney, Agent, or Firm*—Connolly and Hutz

[57] ABSTRACT

Flameproof moulding compositions, which are based on polyolefins and made from a pulverulent blend comprising a polyolefin as its essential ingredient and a plurality of flame-retardant ingredients. The flame-retardant ingredients comprise red phosphorus and at least one organic nitrogen compound which carbonizes after inflammation. The moulding compositions contain the flame-retardant ingredients in a total proportion of at most about 30 weight %. Red phosphorus and organic nitrogen compound are used in a quantitative ratio between 99:1 and 1:99.

4 Claims, No Drawings

FLAMEPROOF MOULDING COMPOSITIONS BASED ON POLYOLEFINS

This application is a division of application Ser. No. 362,517, filed May 21, 1973.

The present invention provides flame-retardant moulding compositions which are based on polyolefins and made from a pulverulent blend comprising a polyolefin as its essential ingredient and a plurality of flame-retardant ingredients.

Polyolefins, which are easy to work, have good chemical, mechanical and electrical properties and, last but not least, are relatively inexpensive materials, find very widespread uses. Polyolefins which have been rendered flameproof find further technical uses, particularly in the mining industries, in constructional engineering and in the automotive industries, where flameproofness is generally highly desirable for reasons of safety. In rendering plastics flameproof, it is desirable, however, to have a flame-retardant agent which is easy to incorporate with the plastics and which does substantially not affect the properties characteristic of plastics that have been treated therewith. For polyolefins, it is often difficult to satisfy these specifications. To achieve satisfactory flameproofing effects, it is normally necessary to incorporate the flameproofing agent in quantities which strongly impair the plastics physical properties.

In accordance with German Pat. No. 1,048,409, polyolefins, such as polyethylene, polypropylene or polystyrene, can be rendered flameproof by admixing them with between 5 and 25 percent of a blend of antimony trioxide and polyolefins containing between 15 and 50 percent of chlorine.

A further flameproofing blend for polyolefins has been described in U.S. Pat. No. 3,370,030, the blend comprising a chlorinated hydrocarbon containing between 40 and 80 percent of bound chlorine, and a diphosphine oxide, for example ethylene-bis-diphenyl-phosphine oxide.

An adverse phenomenon resides in the fact that it is necessary for good flameproofing to use the above blends of flameproofing agents in relatively large proportions, which strongly impair the plastics' mechanical properties and their thermostability. As a result, it is hazardous to process the plastics at elevated temperatures, at which they may tend to decompose. Still further, in various fields, for example in electrical engineering, it is not very desirable to have plastics containing halogen, particularly chlorine or bromine, in view of the fact that they liberate hydrogen halide, under thermal load. In the event of fire-outbreaks, the hydrogen halide in turn corrodes and effects serous secondary damage to metals.

German Pat. No. 1,173,641 finally describes a process for flameproofing polyurethanes with the use of red phosphorus, which enables the burn-up length to be shortened and self-extinguishing properties to be imparted to a test specimen. No such effect can be produced in polyolefins with the use merely of red phosphorus, even if used in proportions up to 30 weight %.

The use of inorganic phosphates, such as ammonium polyphosphate, as flameproofing components for polyolefins is a commercially unattractive procedure as satisfactory flameproofing can be achieved only by incorporating an at least 50 weight % proportion of ammonium polyphosphate with the polyolefin.

We have now found that polyolefins can be rendered flameproof with the use of a combination comprising red phosphorus and certain halogen-free substances, which themselves do not effect flameproofness.

The present invention provides more particularly flameproof moulding compositions, which are based on polyolefins and made from a pulverulent blend comprising a polyolefin as its essential ingredient and a plurality of flame-retardant ingredients, the said flameproof moulding compositions containing, as the flame-retardant ingredients, red phosphorus and at least one organic nitrogen compound, which carbonizes after inflammation, in a total proportion of at most about 30 weight %, the red phosphorus and the organic nitrogen compound being used in a quantitative ratio between 99:1 and 1:99.

The polyolefins, which can be rendered flameproof in accordance with the present invention, include high pressure and low pressure polyethylene or polypropylenes, for example.

A preferred embodiment of the present invention comprises using fine particulate red phosphorus or fine particulate organic nitrogen compounds with a size of at most 200 microns, more preferably with a size of at most 75 microns. The organic nitrogen compound may be selected, for example, from melamine or polyacrylonitrile with a molecular weight between 15,000 and 250,000 or with a chain length between 280 and 4 700.

The moulding compositions should preferably contain the flame-retardant ingredients in a total proportion substantially between 10 and 30 weight %. Particularly good flameproofing effects are produced by the use of red phosphorus and organic nitrogen compound in a quantitative ratio between 70:30 to 30:70, preferably 50:50.

The flameproofing effects produced in accordance with the present invention are believed to be a result of the fact that the organic compound in the polyolefin is carbonized upon inflammation with the resultant formation of a carbon layer which has a structure similar to that of graphite. The following is a formula representation of the mechanism underlying carbonization, in polyacrylonitrile.

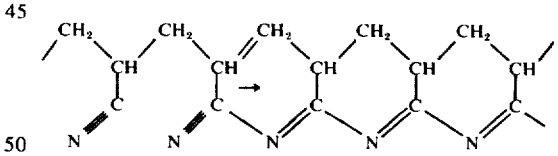

The carbonization upon inflammation is even promoted by red phosphorus which undergoes combustion to phosphorus oxides. These, however, act as strong dehydrating agents which favorably influence the polycondensation represented by the above formula. As a result, a surface heat-retaining carbon layer, which has glassy metaphosphoric acid embedded therein, is formed. This tight-structured layer extensively avoids the formation of burning decomposition products and equally avoids further admittance of atmospheric oxygen, which is necessary to sustain the combustion. As compared with plastics rendered flameproof by known methods, those which are rendered flameproof in accordance with the present invention have a considerably lesser tendency to drop off after inflammation. This appears to vouch for the accuracy of the above hypothesis. In addition to this, specimens rendered flameproof in accordance with this invention have been found to produce considerably less soot, upon inflammation.

One of the valuable beneficial effects of the present invention resides in the fact that relatively minor proportions of the blend of halogen-free flame-retardant agents are needed for achieving good flameproofing effects. As a result, the mechanical and rheological properties of the plastics are substantially not affected. Certain properties, for example the ball indentation hardness, are even improved. The plastics rendered flameproof in accordance with the present invention are substantially unproblematic and easy to work in view of the fact that their melt indexes are immaterially reduced only by the addition of the flame-retardant agents in proportions up to 30 weight % and in view of the fact that the phenomenon of thermal decomposition, which often accompanies the use of halogenated flame-retardant agents, does not appear at normal processing temperatures, in the present case.

The present blend of pulverulent flame-retardant agents should be mechanically incorporated with the plastics so as to ensure an optimum degree of distribution therein. Use can be made, for example, of a closable intense mixer for the homogeneous distribution of the blend of flame-retardant agents in the pulverulent plastics.

The flameproof polyolefins of the present invention compare favorably with polyolefins stabilized in known manner, as regards non-burning properties. By the addition of merely a 10 weight % proportion of the present blend of flame-retardant agents, it is possible to render polyolefins non-burning (ASTM D 635-68) without affecting their mechanical or rheological properties including ball indentation hardness, notched impact strength or flow properties. A further valuable avantage resides in the freeness from halogen of all individual components making the present blend of flame-retardant agents. With the use merely of red phosphorus, it is impossible to impart satisfactory flameproofness to polyolefins. With this in mind, it is an unexpected result that it is possible for the flameproofing properties of red phosphorus to be improved synergetically by using it in admixture with certain organic nitrogen compounds which, per se are not flameproofing agents.

The following Examples illustrate the efficiency of the present blends of flame-retardant agents in polyolefins, without limiting the present invention thereto.

EXAMPLE 1

The flammability (ASTM-D 635-68) of test tapes made from low pressure polyethylenes, which had different proportions of flame-retardant agents incorporated therein, was tested. The low pressure polyolefins had a melt index of 19.6 and a density of 0.965 g/cc (DIN = German Industrial Standards 53 735). The test tapes were 1.28 cm wide and 4 mm thick. They were cut out from compressed sheets. The sheets were made by compressing pulverulent polyethylene in a steam-heated hydraulic press at 180°C under a pressure of 50 kg/sqcm. Flameproof polyethylene was produced by intimately mixing the pulverulent polyethylene with a certain quantity of flame-retardant agents, prior to delivering the powder to the hydraulic press. The burn-up tests were made in accordance with ASTM-D 635-68. The results obtained are indicated in the following Table 1, wherein the various abbreviations have the following meanings.

PE = Low pressure polyethylene; melt index $(i_5)$: 19.6; density: 0.965 g/cubic centimeter.

$Sb_2O_3$ = Antimony trioxide.

CP = Chloroparaffin with 70 % of chlorine, described in U.S. Pat. No. 2,962,464.

CPE = Chlorinated low pressure polyethylene with a molecular weight of 50,000 and 28 % of chlorine, described in German Pat. No. 1,048,409.

P = Particulate red phosphorus with a size of at most 100 microns.

Me = Particulate melamine with a size of at most 100 microns.

PAN = Polyacrylonitrile with a molecular weight of 150,000 or a chain length of 2,800.

Column A = Burn-up rate of test tape in mm/minute.

Column $B_1$ = Burn-up length until self-extinction in mm.

Column $B_2$ = Burn-up time until self-extinction in seconds.

Column C = Non-flammability of test tape.

$i_5$ = Melt index of test tape, determined in accordance with DIN specification 53 735.

KH = Ball indentation hardness of test tape, determined in accordance with DIN specification 53,456.

KZ = Notched impact strength of test tape, determined in accordance with DIN specification 53,453.

Table 1 enables the flammability of pure polyethylene to be compared with that of polyethylene which has been rendered flameproof. Specimens 7 and 8 and 14 and 15 were of polyethylene rendered flameproof in accordance with the present invention. Specimens 2 to 6 and 9 to 13 contained either known flame-retardant agents or merely one of the components making the present blend of flame-retardant agents. As results from the burn-up tests, a test tape, which contained as little as 10 weight %, for example, of the present blend of flame-retardant agents, was found to be self-extinguishing or non-burning, 10 seconds after inflammation. The comparative test tapes, which were all "burning," did burn off at different rates. Table 1 also shows the merely minor modification of the mechanical properties and melt indexes $i_5$ of the test tapes rendered flameproof in accordance with the present invention, as compared with the corresponding data of pure polyethylene.

EXAMPLE 2

The procedure was the same as that described in Example 1 save that low pressure polyethylene of high molecular weight, which had a melt index $i_5$ of less than 0.01, a flow index of 2,300 and a density of 0.94 g/cc, was used. The flow index of the polyethylene was determined in accordance with ASTM D 1430-65 T. The test results are indicated in Table 2. The (ZST) column in Table 2 indicates the flow indexes of the individual test specimens, the remaining columns having the same meanings as those in Table 1.

As results from Table 2, test tapes 18 to 21 and 23, which were rendered flameproof in accordance with this invention, were found to compare favorably with comparative test tapes 16, 17 and 22, as regards flammability, mechanical properties and flow index.

EXAMPLE 3

The procedure was the same as that described in Example 1 save that high pressure polyethylene, which had a melt index $i_5$ of 0.58 and a density of 0.918 g/cc, was used. The test results are indicated in Table 3.

As results from Table 3, the flameproofing effect produced was found to be a function of the concentration of the blend of flame-retardant agents, in the polyethylene.

Table 4 shows, as does Table 3, that the flameproofing effect was found to be a function of the concentration of the blend of flame-retardant agents, in the polypropylene.

Table 1:

| Specimen No. | Composition of test tape in weight % | | | | | | | Burn-up test ASTM D 635-68 | | | | $i_5$ | KH | KZ |
|---|---|---|---|---|---|---|---|---|---|---|---|---|---|---|
| | PE | $Sb_2O_3$ | CP70 | CPE | P | Me | PAN | A | $B_1$ | $B_2$ | C | | | |
| 1 | 100 | — | — | — | — | — | — | 14.3 | — | — | — | 19.6 | 585 | 3.0 |
| 2 | 90 | 6.65 | 3.35 | — | — | — | — | 9.6 | — | — | — | 19.9 | 556 | 2.2 |
| 3 | 90 | 3.26 | — | 6.74 | — | — | — | 14.5 | — | — | — | 18.1 | 550 | 2.9 |
| 4 | 90 | — | — | — | 10 | — | — | 11.7 | — | — | — | 18.0 | 545 | 2.9 |
| 5 | 90 | — | — | — | — | 10 | — | 15.9 | — | — | — | 17.2 | 575 | 3.0 |
| 6 | 90 | — | — | — | — | — | 10 | 15.8 | — | — | — | 14.1 | 630 | 2.6 |
| 7 | 90 | — | — | — | 5 | 5 | — | — | — | — | + | 18.3 | 610 | 2.8 |
| 8 | 90 | — | — | — | 5 | — | 5 | — | 7 | 75 | — | 16.0 | 615 | 2.3 |
| 9 | 67.8 | 21.4 | 10.8 | — | — | — | — | — | 7 | 105 | — | 27.7 | 600 | 1.9 |
| 10 | 70 | 9.8 | — | 20.2 | — | — | — | 9.6 | — | — | — | 12.5 | 395 | 2.7 |
| 11 | 70 | — | — | — | 30 | — | — | 15.5 | — | — | — | 14.9 | 660 | 2.5 |
| 12 | 70 | — | — | — | — | 30 | — | 12.7 | — | — | — | 14.1 | — | — |
| 13 | 70 | — | — | — | — | — | 30 | 17.8 | — | — | — | 4.8 | 775 | 1.8 |
| 14 | 70 | — | — | — | 15 | 15 | — | — | 10 | 133 | — | 15.3 | 690 | 2.2 |
| 15 | 70 | — | — | — | 15 | — | 15 | 14.0 | — | — | — | 9.7 | 710 | 2.3 |

Table 2:

| Specimen No. | Composition of test tape in weight % | | | | | | | Burn-up test ASTM D 635-68 | | | | ZST | KH | KZ |
|---|---|---|---|---|---|---|---|---|---|---|---|---|---|---|
| | PE | $Sb_2O_3$ | CP70 | P | Me | PAN | A | $B_1$ | $B_2$ | C | | | | |
| 16 | 100 | — | — | — | — | — | 18 | — | — | — | 2300 | 385 | 140 | |
| 17 | 90 | 3.35 | 6.65 | — | — | — | 9.6 | — | — | — | 4300 | 396 | 54 | |
| 18 | 90 | — | — | 5 | 5 | — | 8 | — | — | — | 2200 | 396 | 118 | |
| 19 | 90 | — | — | 5 | — | 5 | 9 | — | — | — | 2200 | 408 | 126 | |
| 20 | 85 | — | — | 7.5 | 7.5 | — | 3 | — | — | — | 2400 | 427 | 88 | |
| 21 | 85 | — | — | 7.5 | — | 7.5 | 4 | — | — | — | 2400 | 451 | 91 | |
| 22 | 67.8 | 21.4 | 10.8 | — | — | — | — | 18 | — | — | — | 452 | 9 | |
| 23 | 70 | — | — | 15 | 15 | — | — | — | — | + | 2100 | 478 | 25 | |

Table 3:

| Specimen No. | Composition of test tape in weight % | | | | Burn-up test ASTM D 635-68 | | | |
|---|---|---|---|---|---|---|---|---|
| | PE | P | Me | PAN | A | $B_1$ | $B_2$ | C |
| 24 | 100 | — | — | — | 17.9 | — | — | — |
| 25 | 90 | 5 | 5 | — | — | 12 | 105 | — |
| 26 | 90 | 5 | — | 5 | — | 10 | 90 | — |
| 27 | 70 | 15 | 15 | — | — | 2 | 60 | — |

Table 4:

| Specimen No. | Composition of test tape in weight % | | | | Burn-up test ASTM D 635-68 | | | |
|---|---|---|---|---|---|---|---|---|
| | PP | P | Me | PAN | A | $B_1$ | $B_2$ | C |
| 28 | 100 | — | — | — | 28.5 | — | — | — |
| 29 | 90 | 5 | 5 | — | 23.5 | — | — | — |
| 30 | 90 | 5 | — | 5 | — | 12 | 53 | — |
| 31 | 80 | 5 | — | 15 | — | 12 | 70 | — |
| 32 | 70 | 15 | 15 | — | 8.6 | — | — | — |
| 33 | 70 | 15 | — | 15 | — | 5 | 25 | — |
| 34 | 70 | 10 | — | 20 | — | 4 | 19 | — |

EXAMPLE 4

The procedure was the same as that described in Example 1 save that polypropylene, which had a melt index $i_5$ of 8 (230°C) and a density of 0.905 g/cc, was used as the polyolefin. The test results are indicated in Table 4, in which PP stands for polypropylene.

We claim:
1. A flameproof moulding composition comprising a pulverulent blend of a polyolefin and a plurality of flame retardants consisting of, in addition to red phosphorus, polyacrylonitrile having a molecular weight of 15,000 – 250,000 and a particle size of 75–200 microns, the amount of flame retardants being about 10–30 weight % of said composition and the quantitative ratio of red phosphorus and polyacrylonitrile being

70:30 – 30:70.

2. The moulding composition as claimed in claim 1, wherein the polyolefin is polyethylene or polypropylene.

3. The moulding composition as claimed in claim 1, wherein the red phosphorus has a particle size of 75–200 microns.

4. The moulding composition as claimed in claim 1, wherein the quantitative ratio of red phosphorus and polyacrylonitrile is 50:50.

* * * * *